(12) United States Patent
Robert (10) Patent No.: US 8,757,513 B2
(45) Date of Patent: Jun. 24, 2014

(54) VALVE FOR SPRAYING COATING MATERIAL, AND AN ATOMIZER INCLUDING SUCH A VALVE

(75) Inventor: Stephane Robert, Meylan (FR)

(73) Assignee: Sames Technologies, Meylan (FR)

( * ) Notice: Subject to any disclaimer, the term of this patent is extended or adjusted under 35 U.S.C. 154(b) by 481 days.

(21) Appl. No.: 13/133,010

(22) PCT Filed: Dec. 8, 2009

(86) PCT No.: PCT/FR2009/052454
§ 371 (c)(1),
(2), (4) Date: Jun. 6, 2011

(87) PCT Pub. No.: WO2010/067016
PCT Pub. Date: Jun. 17, 2010

(65) Prior Publication Data
US 2011/0233445 A1    Sep. 29, 2011

(30) Foreign Application Priority Data
Dec. 9, 2008    (FR) ..................................... 08 58413

(51) Int. Cl.
*B05B 15/02*    (2006.01)
*B05B 1/30*    (2006.01)
*F16K 43/00*    (2006.01)

(52) U.S. Cl.
USPC .. 239/112; 239/583; 137/614.16; 137/614.19

(58) Field of Classification Search
USPC .............. 239/104, 106, 112, 533.1, 583, 854;
251/239, 599.16, 614.16, 614.19, 628;
141/2, 18, 100, 104, 105
See application file for complete search history.

(56) References Cited

U.S. PATENT DOCUMENTS

| | | | |
|---|---|---|---|
| 4,458,543 A | 7/1984 | Mieth | |
| 4,582,224 A | 4/1986 | Proksa | |
| 5,301,714 A | 4/1994 | Johnson | |
| 5,494,078 A * | 2/1996 | Schulte | 137/630.14 |
| 6,273,706 B1 * | 8/2001 | Gunther | 425/564 |
| 6,439,479 B1 | 8/2002 | Joensson | |
| 2001/0050113 A1 * | 12/2001 | Shinada et al. | 141/18 |

FOREIGN PATENT DOCUMENTS

| | | |
|---|---|---|
| DE | 3331840 A1 | 3/1985 |
| DE | 4236464 A1 | 5/1994 |

OTHER PUBLICATIONS

International Search Report for PCT/FR2009/0524549; Dated Mar. 18, 2010.

* cited by examiner

*Primary Examiner* — Darren W Gorman
(74) *Attorney, Agent, or Firm* — Husch Blackwell LLP; Robert M. Gould (57) ABSTRACT

This valve (100) comprises: a body (101); a first channel (111) for channelling the flow of a fluid; a second channel (112) for channelling the flow of a fluid; a first valving element (130) which is movable translationally in a first direction ($X_{112}$), between an open position and closed position of the or each first channel (111), the body (101) forming a first seat (123) for the first valving element (130); and a second valving element (130) which is movable translationally in a second direction ($X_{112}$), between an open position and a closed position of the or each second channel (112); the first direction ($X_{112}$) and the second direction ($X_{112}$) being parallel or coinciding with each other. The first valving element (130) defines a housing (140) for the second valving element (130). The first valving element (130) forms a second seat (136) for the second valving element (130).

10 Claims, 5 Drawing Sheets

VALVE FOR SPRAYING COATING MATERIAL, AND AN ATOMIZER INCLUDING SUCH A VALVE

RELATED APPLICATIONS

The present application is a §371 U.S. national stage entry of International Application No. PCT/FR2009/052454, filed Dec. 8, 2009, which claims the priority of France patent application No. 08 58413 filed Dec. 9, 2008, all of which are incorporated herein by reference in its entirety.

FIELD

The present invention relates to a valve for spraying coating material, and to an atomizer including such a valve.

BACKGROUND

EP-A-0 274 322 describes a spraying installation for spraying a coating material onto articles to be coated, in which installation a multi-axis robot moves an atomizer for spraying coating material facing articles to be coated. In the example described below, the coating material is a primer, a paint, or a varnish, and the articles to be coated are motor vehicle bodies transported by a conveyor.

The atomizer is equipped with a reservoir containing the volume of paint that is necessary for performing the stage of spraying paint onto the vehicle body. After that stage, it is necessary to fill the reservoir again by coupling the atomizer to a preselected paint circuit, sometimes referred to as a "circulating" paint circuit. When filling the reservoir again, it is often necessary to change coating material, in particular so as to change the shade of color of the paint. It is therefore necessary to clean the reservoir and the channels of the atomizer, and the coupling zones, by rinsing them with a cleaning material such as a solvent.

That is why a prior art paint spraying installation generally includes at least two distinct coupling means placed respectively between the atomizer and the paint circuit and between the atomizer and the solvent circuit. Those coupling means comprise, amongst others, two distinct valves mounted on and/or in the atomizer for the purpose of controlling, respectively and successively, the flow of solvent and the flow of paint. During the cleaning stage, residual waste solvent and paint must also be collected and then conveyed to a treatment unit, which requires an additional valve. This also requires corresponding additional control members and components for actuating the various valves.

Unfortunately, said juxtaposed valves in the atomizer represent considerable overall size, regardless of their respective dimensions. That overall size increases the overall size of the atomizer and makes its structure more complex. In addition, that overall size reduces access to the other components of the atomizer during maintenance operations.

In addition, those three valves are interconnected via a network of common channels, in particular so as to make it possible to rinse the valve and the ducts for enabling paint to flow towards the reservoir. Unfortunately, the volume of those common channels is filled firstly with paint for the reservoir-filling and spraying stages and secondly with solvent for the cleaning stages, so that that volume gives rise to wastage of paint and to a relatively high consumption of solvent. Paint is also wasted when the reservoir is filled again without changing the shade of paint.

A particular object of the present invention is to remedy those drawbacks by proposing a valve that is compact, that significantly reduces the amount of paint wasted and the solvent consumption, and that simplifies the structure of the atomizer.

SUMMARY

To this end, the invention provides a valve comprising:
a body;
at least one first duct for channeling the flow of a fluid;
at least one second duct for channeling the flow of a fluid;
a first needle mounted to move in translation, in a first direction, between an open position and a closed position for opening and closing the or each first duct, the body forming a first seat for the first needle; and
a second needle mounted to move in translation, in a second direction, between an open position and a closed position for opening and closing the or each second duct.

This valve is characterized in that the first direction and the second direction are parallel or coincide, while the first needle defines a recess for receiving the second needle, and while the first needle forms a second seat for the second needle.

According to other advantageous but optional characteristics of the invention, taken in isolation or in any technically feasible combination:
the first needle and the second needle are circularly symmetrical respectively about the first direction and about the second direction, and the first needle and the second needle are arranged coaxially;
the body defines the first duct, and the second needle has an internal cavity forming a portion of the second duct;
the body has an opening common to the first duct and to the second duct;
the first needle and the second needle come flush with said opening;
the valve further comprises at least one resilient member for urging the first needle and the second needle back into their respective closed positions in which they close the first duct and the second duct, and the first needle and the second needle have respective thrust surfaces arranged in such a manner as to transmit thrust forces exerted by a thrust fluid, such as compressed air, in the first direction or in the second direction in opposition to the resilient member;
at least one resilient member is formed by a crest-to-crest multi-turn spring;
the first duct extends substantially transversely to the second duct;
the first duct and the second duct are arranged to receive a first type of fluid, such as a cleaning material, or a second type of fluid, such as a coating material;
the first seat and the second seat are frustoconical in shape; and
the first needle and the second needle present wetted surfaces that are substantially locally tangential to the lines of flow of the fluids, in such a manner as to limit fluid retention.

In addition, the invention provides an atomizer for spraying coating material, said atomizer including a valve as described above.

The invention can be well understood and its advantages also appear from the following description, given merely by way of non-limiting example and with reference to the accompanying drawings, in which:

DETAILED DESCRIPTION

Figure 1:
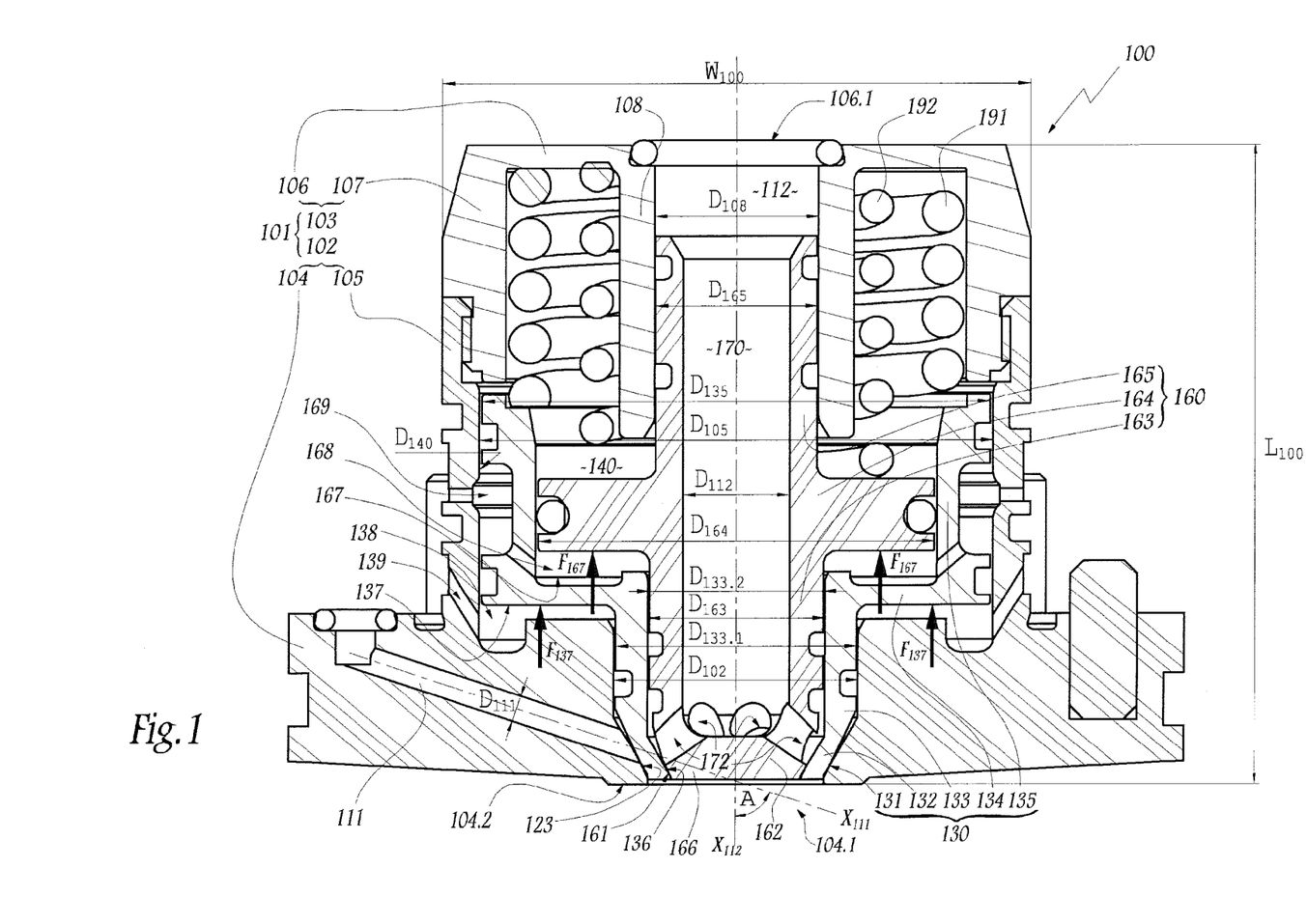
FIG. 1 is a section view of a first embodiment of a valve of the invention.

FIG. 1 shows a valve 100 comprising a body 101, a first duct 111 and a distinct second duct 112, in which duct fluids can flow that are used during filing, spraying, and cleaning stages, e.g. paint, solvent, and compressed air.

The valve 100 further comprises a first needle 130 and a second needle 160, which needles have the function of allowing or preventing fluid flow. The body 101 houses the first needle 130 and the second needle 160. In addition, the first needle 130 defines a recess 140 adapted to receive a substantial portion of the second needle 160.

The body 101 is made up of an upstream half-body 102 and of a downstream half-body 103. The upstream half-body 102 is formed essentially of an upstream end plate 104 and of an upstream cylindrical wall 105 that are united with each other. The downstream half-body 103 is formed essentially of a downstream end plate 106 and of a downstream cylindrical wall 107. The upstream and downstream end plates 104 and 106 are generally disk-shaped. The upstream and downstream end plates 104 and 106 are provided respectively with an upstream through opening 104.1 and with a downstream through opening 106.1. The upstream opening 104.1 and the downstream opening 106.1 are of circular shape and make it possible for the fluids to pass through the first duct 111 and the second duct 112, as described in detail below.

The upstream half-body 102 and the downstream half-body 103 are assembled together by the upstream cylindrical wall 105 and the downstream cylindrical wall 107 being fastened together. The upstream and downstream cylindrical walls 105 and 107 may be fastened together by clip-fastening or by screw-fastening, as in the first and second embodiments shown in FIGS. 1 and 2, or by any other equivalent fastening means.

In the present patent application, the terms "upstream" and "downstream" are used with reference to the general direction of flow of the fluids through the first duct 111 and through the second duct 112. These flows are shown in FIGS. 4 to 7 by lines of flow $L_{211}$, $L_{212}$, $L_{311}$, and $L_{312}$.

The first needle 130 is mounted to move in translation in a first direction represented by an axis $X_{112}$ that is vertical in FIG. 1. The second needle 160 is mounted to move in translation in a second direction that is also represented by the axis $X_{112}$. In other words the first direction and the second direction in which the first needle 130 and the second needle 160 respectively move are co-linear and coincide as a common axis $X_{112}$.

The first needle 130 is mounted to move between an open position in which it opens the first duct 111, and a closed position in which it closes said first duct. The second valve 160 is mounted to move between an open position in which it opens the second duct 112, and a closed position in which it closes said second duct. FIG. 1 shows the valve 100 as placed in its closure configuration, with the first needle 130 and the second needle 160 being in their respective closed positions. In other words, in FIG. 1, the first needle 130 and the second needle 160 are in their closed positions in which they close the first duct 111 and the second duct 112 respectively. In the configuration shown in FIG. 1, no fluid can flow in the first duct 111 or in the second duct 112.

The first needle 130 is made up of a first upstream end-piece 132 that is frustoconical in shape, of a first upstream cylinder 133, of a first ring 134, and of a first downstream cylinder 135. The axis $X_{112}$ is common to the first upstream end-piece 132, to the first upstream cylinder 133, to the first ring 134, and to the first downstream cylinder 135. The first needle 130 is thus circularly symmetrical about the first translation direction constituted by the axis $X_{112}$. The first needle 130 is hollow. More precisely, the first upstream end-piece 132, the first upstream cylinder 133, the first ring 134, and the first downstream cylinder 135 have hollow central regions that communicate with one another.

The second needle 160 is made up of a second upstream end-piece 162 that is frustoconical in shape, of a second upstream cylinder 163, of a second ring 164, and of a second downstream cylinder 165. The axis $X_{112}$ is common to the second upstream end-piece 162, to the second upstream cylinder 163, to the second ring 164, and to the second downstream cylinder 165. The second needle 160 is thus circularly symmetrical about the second translation direction constituted by the axis $X_{112}$. The second needle 160 is hollow. More precisely, the second upstream end-piece 162, the second upstream cylinder 163, the second ring 164, and the second downstream cylinder 165 have hollow central regions that communicate with one another.

The first needle 130 and the second needle 160 are thus arranged coaxially about the axis $X_{112}$.

In the present patent application, the terms "interconnect", "connect", "couple", and "communicate" refer to fluid communication, i.e. to a link enabling a gaseous or liquid fluid to flow or to circulate between two or more points or parts. Such a link may be direct or indirect, i.e. formed by a duct, by a pipe, or by a channel etc. Similarly, the nouns derived from these verbs, such as "interconnection", "connection", and "coupling", concern such fluid communication.

Close to the upstream opening 104.1, the body 101 forms a first seat 123 for the first needle 130. More precisely, the first seat 123 is constituted by a frustoconical surface of axis $X_{112}$ that is provided in the upstream half-body 102 and that converges towards the axis $X_{112}$ going towards the upstream opening 104.1. The first upstream end-piece 132 has an outside radial surface 131 having a frustoconical shape that is complementary to the frustoconical shape of the seat 123. When the first needle 130 is in the closed position, the outside radial surface 131 bears in leaktight manner against the seat 123. The first needle 130 thus closes the first duct 111.

In the present application the adjectives "radial" and "axial" are used with reference to the general orientation of the element they describe. For example, a surface is said to be "radial" or "axial" depending on whether a normal to said surface is oriented perpendicularly or parallel to the axis $X_{112}$.

In the present application, the adjectives "inside" and "outside" respectively designate an element facing towards the axis $X_{112}$ and an element facing away from the axis $X_{112}$.

The first needle 130 forms a second seat 136 for the second needle 160. The seat 136 is formed by an inside radial surface of the second upstream end-piece 132, which surface is of frustoconical shape. The second needle 160 has a terminal plate 166 situated at the upstream end of the second upstream end-piece 162.

The terminal plate 166 has terminal axial surface that is disk-shaped, and that closes off a substantial fraction of the upstream opening 104.1. The terminal plate 166 also has an outside radial surface 161 having a frustoconical shape that is complementary to the frustoconical shape of the second seat 136. When the second needle 160 is in the closed position, the outside radial surface 161 of the second upstream end-piece 162 bears in leaktight manner against the second seat 136. The second needle 160 thus closes the second duct 112.

The first needle 130 and the second needle 160 come flush with the upstream opening 104.1. More precisely, the respective terminal axial surfaces of the first upstream end-piece 132 and of the second upstream end-piece 162 come flush with an outer surface 104.2 of the upstream end plate 104. This arrangement makes it possible to minimize the overall size of the valve 100 and to reduce coating material consumption and cleaning material consumption.

The body 101 defines the first duct 111 that is machined in the upstream half-body 102. The first duct 111 extends rectilinearly along an axis $X_{111}$. A substantial portion of the second duct 112 is formed by an internal cavity 170 formed by a blind and cylindrical recess of axis $X_{112}$ that is provided through the second needle 160. The second duct 112 thus extends essentially along the axis $X_{112}$. The axis $X_{111}$ of the first duct 111 is substantially transverse to the axis $X_{112}$. The adverb "substantially" indicates that the axis $X_{111}$ and the axis $X_{112}$ may be disjoint, i.e. non-intersecting. In the plane of FIG. 1, the axis $X_{111}$ and the axis $X_{112}$ form an angle A of about 70°.

The first needle 130 can slide inside the body 101 and following a sliding and pivoting connection along and about the axis $X_{112}$. In practice, the outside radial surface of the first upstream cylinder 133 has a diameter $D_{133.1}$ that is slightly smaller than the diameter $D_{102}$ of the inside radial and cylindrical surface of the upstream half-body 102. The difference between the diameter $D_{133.1}$ and the diameter $D_{102}$ corresponds to operating clearance allowing the first upstream cylinder 133 to slide inside the upstream half-body 102.

Similarly, the diameter $D_{135}$ of the outside radial surface of the first downstream cylinder 135 is slightly smaller than the diameter $D_{105}$ of the inside radial surface of the upstream cylindrical wall 105. The difference between the diameter $D_{105}$ and the diameter $D_{135}$ corresponds to operating clearance that allows the first downstream cylinder 135 to slide in the upstream cylindrical wall 105.

In analogous manner, the second needle 160 can slide inside the first needle 130 and in the downstream half-body 103, sliding and pivoting along and about the axis $X_{112}$. For this purpose, the diameter $D_{163}$ of the outside radial surface of the first upstream cylinder 163 is slightly smaller than the diameter $D_{133.2}$ of the inside radial surface of the first upstream cylinder 133. The difference between the diameter $D_{133.2}$ and the diameter $D_{163}$ corresponds to operating clearance that allows the first upstream cylinder 163 of the second needle 160 to slide in the first upstream cylinder 133 of the first needle 130.

Similarly, the diameter $D_{164}$ of the outside radial surface of the first ring 164 is slightly smaller than the diameter $D_{140}$ of the inside radial surface of the recess 140 that is defined by the inside radial surface of the first downstream cylinder 135. The difference between the diameter $D_{164}$ and the diameter $D_{140}$ corresponds to operating clearance that allows the first ring 164 to slide in the recess 140. In addition, the diameter $D_{165}$ of the outside radial surface of the first downstream cylinder 165 is slightly smaller than the diameter $D_{108}$ of the inside radial surface of an inner wall 108 of cylindrical shape that belongs to the downstream half-body 103. The difference between the diameter $D_{108}$ and the diameter $D_{165}$ corresponds to operating clearance that allows the first downstream cylinder 165 to slide in the inner wall 108.

Figure 8:
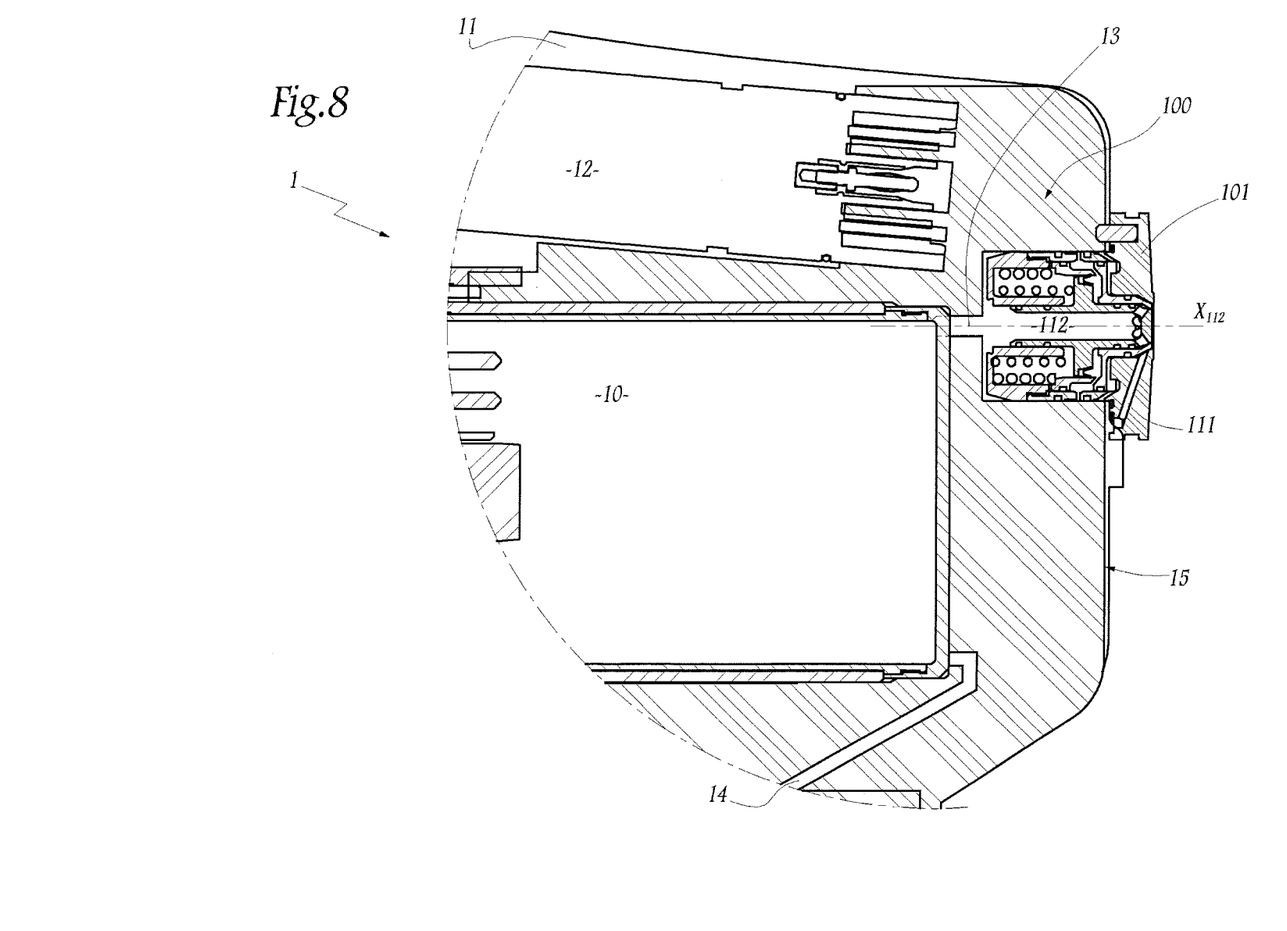
FIG. 8 is a fragmentary section view of an atomizer of the invention.

FIG. 8 shows an atomizer 1 having a body 11 housing a reservoir 10 containing the coating material, and a high-voltage unit 12. The atomizer 1 has a valve 100 described above with reference to FIG. 1. A connection duct 13 connects the upstream of the reservoir 10 to the upstream opening 104.1 of the valve 100. The connection duct 13 is partially formed by the second duct 112. The downstream of the reservoir 10 is connected to an atomizer member (not shown) via a feed duct 14. The body 11 has an outside surface 15 surrounding the upstream opening 104.1

As shown in FIG. 1, the upstream opening 104.1 is common to the first duct 111 and to the second duct 112. When the valve 100 is in the opening configuration, the paint and the solvent can flow successively through the upstream opening 104.1 during the stages of cleaning and of filling the reservoir 10 of the atomizer 1. The second upstream end-piece 162 of the second needle 160 has orifices 172 distributed about the axis $X_{112}$. Via the orifices 172, the fluids (paint, solvent, and compressed air) can flow from the upstream opening 104.1 towards the internal cavity 170, and thus towards the second duct 112.

The diameter $D_{111}$ of the first duct 111 is about 3 millimeters (mm), because it serves to pass solvent and compressed air for the purpose of cleaning the channels and the atomizer member of the atomizer 1. The diameter $D_{112}$ of the second duct 112, as measured in its narrowest portion, is about 8 mm, because it serves to pass paint. Thus, the first duct 111 and the second duct 112 are arranged to receive respectively a first type of fluid such as a cleaning material, constituted by solvent and by compressed air, or a second type of fluid such as a coating material constituted by paint.

The valve 100 has a length $L_{100}$, as measured parallel to the axis $X_{112}$, of about 49 mm. The valve 100 has a width $W_{100}$, as measured perpendicularly to the axis $X_{112}$, of about 44 mm. Thus, the valve 100 is particularly compact.

This compactness of the valve 100 facilitates access to the other components of the atomizer 1 during maintenance operations, and it limits wastage of paint and consumption of solvent. In addition, this compactness limits head losses generated by the valve 100 on the flows of paint and of solvent, thereby improving the effectiveness of the cleaning and increasing the flow-rate of filling of the reservoir 10, and thus reducing the time required for changing shades of paint.

The first needle 130 and the second needle 160 have respective thrust surfaces 137 and 167 that are arranged in such manner as to transmit respective thrust forces $F_{137}$ and $F_{167}$ exerted by a thrust fluid, which is compressed air in this example. The compressed air is injected onto the first thrust surface 137 via a first thrust chamber 138 and via a first thrust channel 139. The compressed air is brought onto the second thrust surface 167 via a second thrust chamber 168 and via a second thrust channel 169, which channel is provided through the upstream cylindrical wall 105 and communicates with the second thrust chamber 168 through the first downstream cylinder 135. The thrust surfaces 137 and 167 are fainted by respective upstream axial surfaces of the rings 134 and 164.

The thrust forces $F_{137}$ and $F_{167}$ are distributed respectively over the set of thrust surfaces 137 and 167. The resultants of the thrust forces $F_{137}$ and $F_{167}$ are exerted parallel to the axis $X_{112}$, i.e. in the first translation direction in which the first needle 130 moves in translation, and in the second translation direction in which the second needle 160 moves in translation.

In order to urge the first needle 130 and the second needle 160 back into their respective closed positions in which they close the first duct 111 and the second duct 112, the valve 100 further includes a first spring 191 and a second spring 192. The first spring 191 and the second spring 192 respectively constitute a first resilient member and second resilient member for urging the first needle 130 and the second needle 160 back into their respective closed positions in which they close the first duct 111 and the second duct 112. The first spring 191 and the second spring 192 work in compression in opposition to respective ones of the thrust forces $F_{137}$ and $F_{167}$.

The surface areas of the thrust surfaces 137 and 167 are determined as a function of the available thrust fluid pressure and of the return forces exerted by the first spring 191 and by the second spring 192. The first spring 191 and the second spring 192 are dimensioned as a function of the paint and solvent feed pressures that are exerted on their upstream end-pieces of type 132. These feed pressures are defined for the paint installation in which the valve 100 is used.

The first spring 191 is a conventional helical wire spring. Alternatively, it may be a crest-to-crest multi-turn spring. For the same length unloaded, a crest-to-crest multi-turn spring offers stiffness greater than the stiffness offered by a conventional helical wire spring. The first spring 191 is flanked laterally by the downstream cylindrical wall 107 and by an inner wall 108 belonging to the downstream half-body 103. The first spring 191 is in abutment firstly against the downstream end plate 106 and secondly against an upstream axial surface of the first downstream cylinder 135.

The second spring 192 is a conventional helical wire spring. The second spring 192 is flanked laterally by the downstream cylindrical wall 107 and by the inner wall 108. The second spring 192 is mounted to bear firstly against the downstream end plate 106 and secondly against an upstream axial surface of the first ring 164.

The valve 100 also includes a plurality of sealing zones that are arranged between its various components for the purpose of making them leaktight relative to the fluids flowing through the valve 100, which fluids are constituted by paint, solvent, and compressed air. The first needle 130 and the second needle 160 are sealed by O-ring seals bearing against radial surfaces, thereby increasing the axial compactness of the valve 100. These radial surfaces correspond to the cylindrical portions of the first needle 130 and of the second needle 160. Implementing the sealing on radial surfaces rather than on axial surfaces makes it possible to retain fluids while eliminating "dead" zones.

Figure 2:
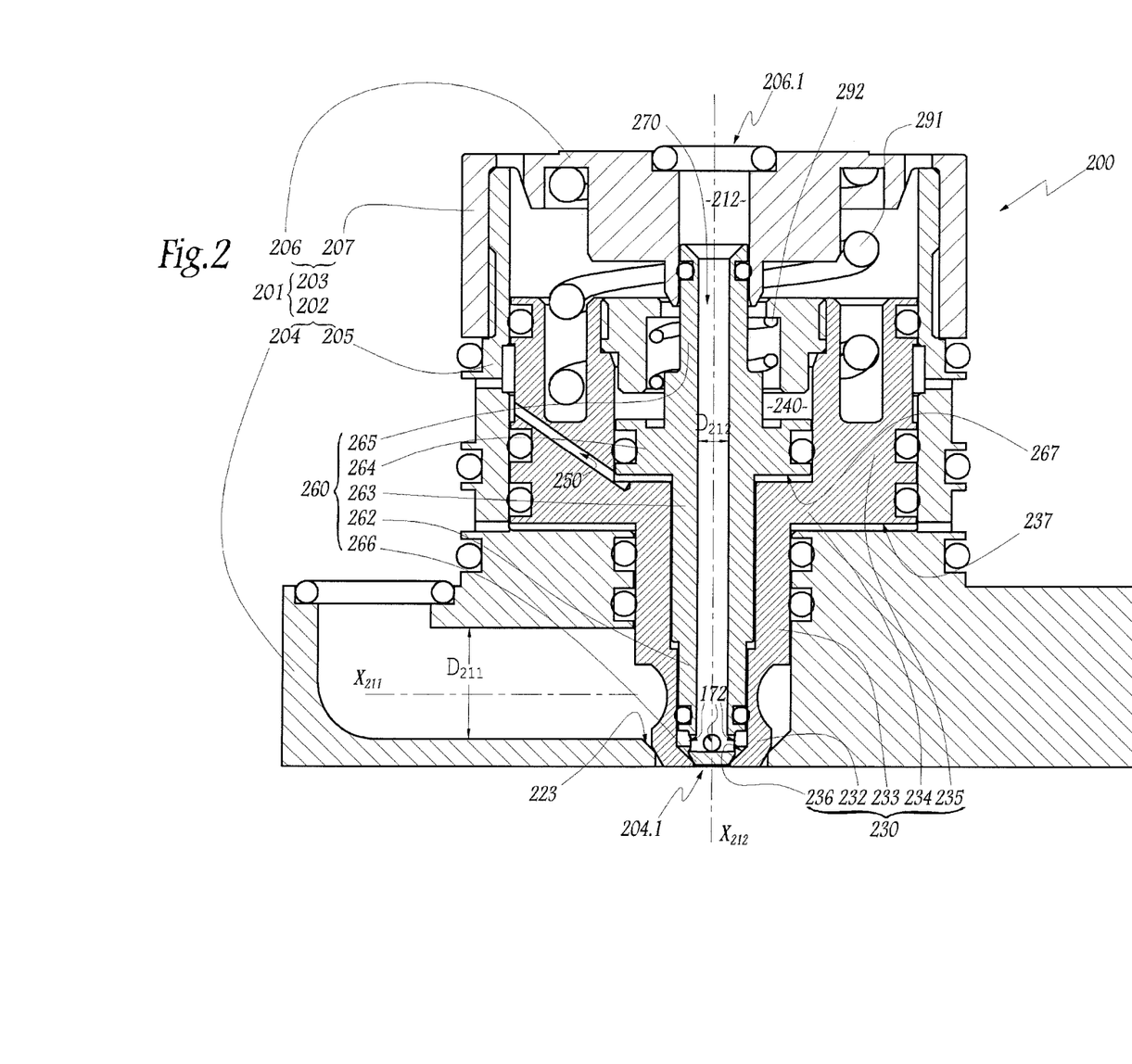
FIG. 2 is a section view of a second embodiment of a valve of the invention.

FIG. 2 shows a second embodiment of a valve 200 of the invention. The description of the valve 100 that is given above can be transposed to the valve 200, except for the significant differences mentioned below. An element of the valve 200 that is identical or that corresponds to an element of the valve 100 bears the same numerical reference plus 100.

This transposition thus defines the valve 200, a body 201, an upstream half-body 202, a downstream half-body 203, an upstream end plate 204, an upstream opening 204.1, an upstream cylindrical wall 205, a downstream end plate 206, a downstream opening 206.1, a downstream cylindrical wall 207, a first duct 211 of axis $X_{211}$, and of diameter $D_{211}$, a second duct 212 of axis $X_{212}$ and of diameter $D_{212}$, a first seat 223, a first needle 230 with a first upstream end-piece 232, a first upstream cylinder 233, a first ring 234, a first downstream cylinder 235, a second seat 236, a first thrust surface 237, a first thrust chamber 238, a recess 240, a second needle 260 with a second upstream end-piece 262, a second upstream cylinder 263, a second ring 264, a second downstream cylinder 265, a terminal plate 266, a second thrust surface 267, a second thrust chamber 268, an internal cavity 270, a first spring 291, and a second spring 292.

The valve 200 differs from the valve 100 essentially by the functions of its first and second ducts, i.e. by the geometrical shapes and dimensions of the first duct 211 and of the second duct 212. The first duct 211 and the second duct 212 extend respectively along an axis $X_{211}$ and along an axis $X_{212}$ that are perpendicular, i.e. that form an angle of 90° between them in the plane of FIG. 2. The valve 200 is more compact than the valve 100, because the length of the valve 200 is 43 mm and its width is 36 mm.

The diameter $D_{211}$ of the first duct 211 is about 8 mm, because it serves more particularly to pass paint. The diameter $D_{212}$ of the second duct 212, as measured in its narrowest portion, is about 3 mm because it serves to pass solvent and compressed air for cleaning the channels and the atomizer member of the atomizer 1. Thus, the second duct 212 and the first duct 211 are arranged to receive respectively a first type of fluid, such as a cleaning material, constituted by solvent and by compressed air, or a second type of fluid, such as a coating material constituted by paint.

In addition, the first upstream end-piece 262 of the second needle 260 is cylindrical in overall shape, unlike the second upstream end-piece 162 of the valve 100 that is frustoconical in shape.

Furthermore, the end-piece 232 of the first needle 230 and the end-piece 262 of the second needle 260 have wetted surfaces that are substantially locally tangential to the lines of flow of the fluids, in such a manner as to limit retention of fluid.

Figure 5:
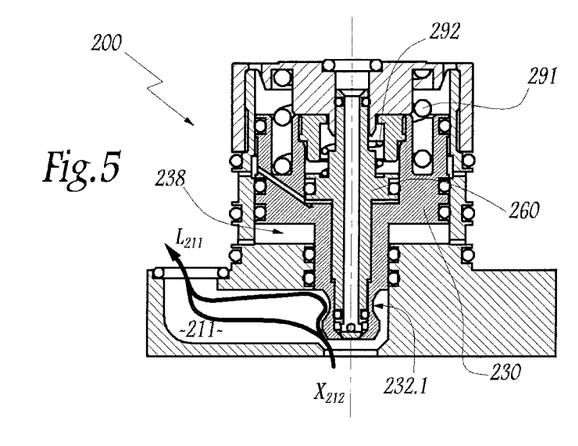

To this end, for example, the valve 200 has a recess 232.1 in the shape of a half-torus, which recess is locally tangential to the lines of flow $L_{211}$, as shown in FIG. 5. The frustoconical shapes of the first and second upstream end-pieces 132 and 162 are also locally tangential to the lines of flow of the fluids, thereby making it possible to limit fluid retention and to improve rinsing of the soiled surfaces.

In addition, the valve 200 also has other structural differences relative to the valve 100. Insofar as these structural differences do not involve operating differences between the valves 100 and 200, they are not described in the present application.

Figure 3:
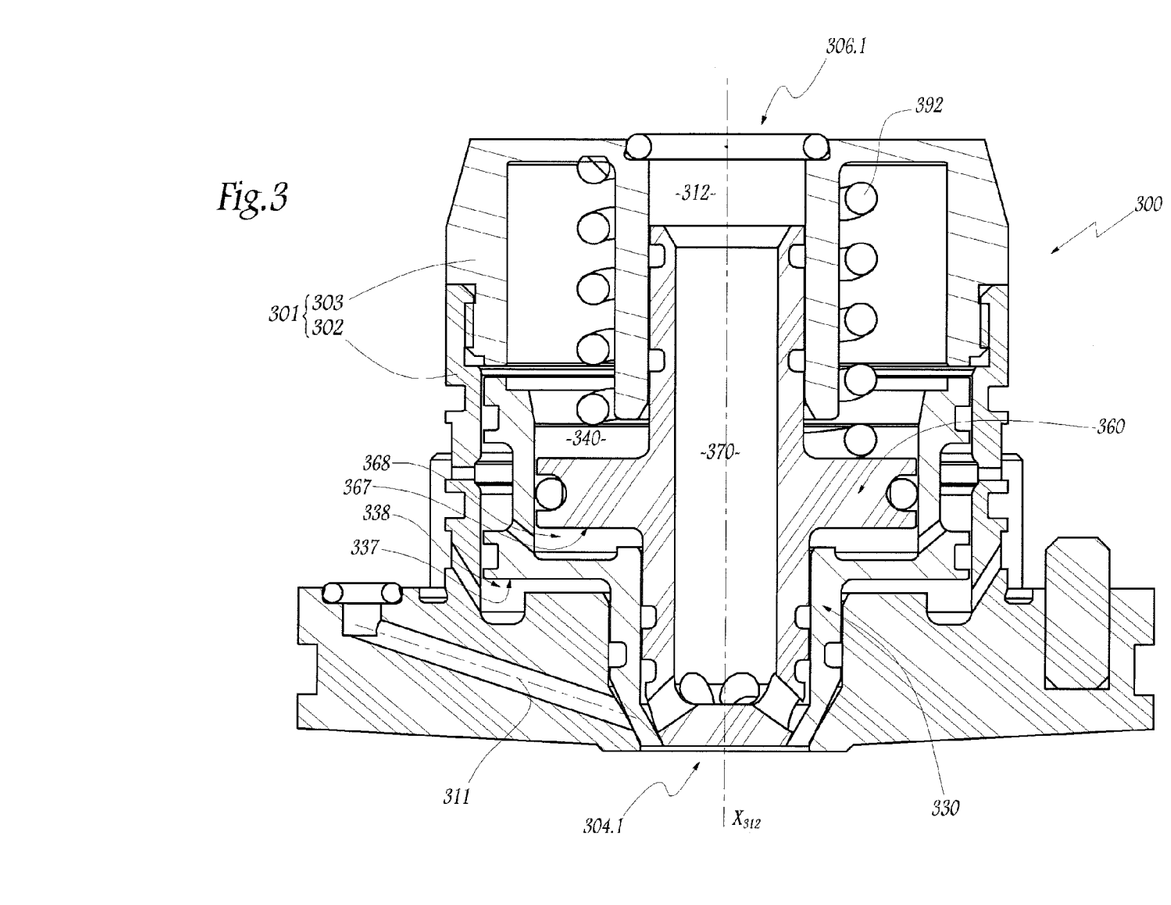
FIG. 3 is a section view similar to FIG. 1, showing a third embodiment of the invention.

FIG. 3 shows a third embodiment of a valve 300 of the invention that is substantially identical to the valve 100 described above with reference to FIG. 1. The description of the valve 100 that is given above can be transposed directly to the valve 300, except for the significant differences mentioned below. An element of the valve 300 that is identical or that corresponds to an element of the valve 100 bears the same numerical reference plus 200.

This transposition thus defines the valve 300, a body 301, an upstream half-body 302, a downstream half-body 303, an upstream opening 304.1, a downstream opening 306.1, a first duct 311, a second duct 312 of axis $X_{312}$, a first needle 330 with a first thrust surface 337, and first thrust chamber 338, a recess 340, a second needle 360 with a second thrust surface 367, and a second thrust chamber 368 and an internal cavity 370.

The valve 300 differs from the valve 100 essentially in that it has a single spring 392 analogous to the second spring 192. The spring 392 constitutes a resilient member for urging the first needle 330 and the second needle 360 into their respective closed positions in which they close the first duct 311 and the second duct 312.

In order to maintain the second needle 360 open, during opening of the first needle 330, the pressure prevailing in the second thrust chamber 368 must be greater than the pressure prevailing in the first thrust chamber 338.

By mounting a single spring 392 instead of two springs 191 and 192, it is possible to reduce the manufacturing costs and to increase the compactness of the valve 300.

Figure 6:
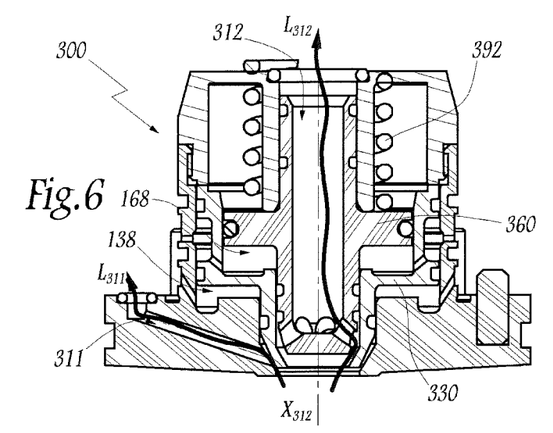
FIGS. 6 and 7 are section views, on a smaller scale, showing the FIG. 3 valve placed in opening configurations.
Figure 7:
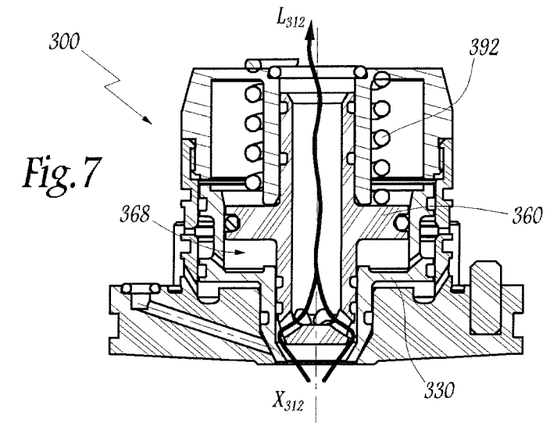

Operation of the valve 300 is shown by FIGS. 6 and 7. Operation of the valve 100 is substantially identical to operation of the valve 300 that is described below. In order to perform the cleaning stage, the valve 300 is placed in a first opening configuration shown by FIG. 6. The first duct 311 and the second duct 312 are opened as a result of the first needle 330 and of the second needle 360 sliding under the effect of the thrusts exerted on the thrust surfaces 337 and 367. The solvent then flows in the first duct 311 and in the second duct 312, thereby cleaning the ducts and all of the downstream elements. The flow of solvent is represented by the lines of flow $L_{311}$ and $L_{312}$.

In order to perform the filling stage, the valve 300 is placed in a second opening configuration shown in FIG. 7. The first duct 311 is closed by the first needle 330, while the second duct 312 is opened by moving the second needle 360. The paint then flows into the second duct 312 towards the reservoir 10. The flow of paint is represented by the line of flow $L_{312}$. No fluid flows into the first duct 211.

When the valve 300 is in a third opening configuration (not shown), the first duct 211 is open, while the second duct 212 is closed.

Figure 4:
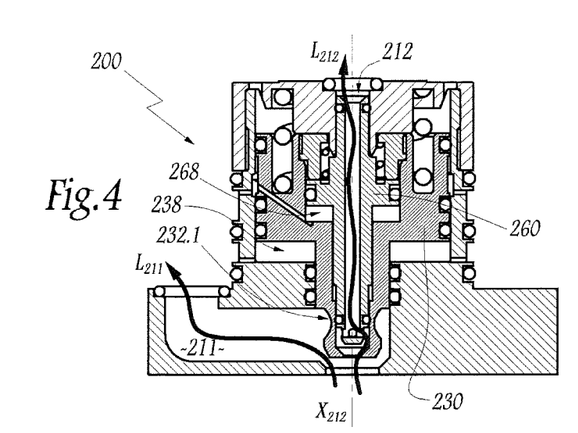
FIGS. 4 and 5 are section views on a smaller scale, showing the FIG. 2 valve placed in opening configurations.

Operation of the valve 200 is shown in FIGS. 4 and 5. In order to perform the cleaning stage, the valve 200 is placed in a first opening configuration shown in FIG. 4. The first duct 211 and the second duct 212 are opened as a result of the first needle 230 and of the second needle 260 sliding under the effect of the thrusts exerted on the thrust surfaces 237 and 267. The solvent then flows through the first duct 211 and through the second duct 212, thereby cleaning these ducts and all of the downstream elements. The flow of solvent is represented by the lines of flow $L_{211}$ and $L_{212}$.

In order to perform the filling stage, the valve 200 is placed in a second opening configuration shown in FIG. 5. The first duct 211 is opened by moving the first needle 230, while the second duct 212 is closed by the second needle 260. Paint then flows into the first duct 211 towards the reservoir 10. The flow of paint is represented by the line of flow $L_{211}$. No fluid then flows in the second duct 212.

When the valve 200 is in a third opening configuration (not shown), the first duct 211 is closed, while the second duct 212 is open.

In addition to its high compactness, a valve of the invention avoids a mechanically blocked construction that, in the prior art, is made necessary by sealing zones being formed simultaneously for two adjacent ducts.

In a variant (not shown), the first translation direction of the first needle is parallel to, without being co-linear with, the second translation direction of the second needle.

In another variant (not shown), the upstream and downstream half-bodies are assembled together by being fastened together by clipping the upstream cylindrical wall onto the downstream cylindrical wall, instead of by screw-fastening as applies to valves 100, 200, and 300. The assembly clearance resulting from that clip-fastening is taken up by the second spring, because the second spring works in compression and pushes back firstly the downstream half-body and secondly the upstream half-body, via the first needle.

In yet another variant (not shown) the first needle 130 and the second needle 160 project out of the upstream opening 104.1, instead of being flush therewith as in valves 100, 200, and 300. This makes it possible to seal off an upstream cavity whenever necessary.

The invention claimed is:

1. A valve comprising:
 a body;
 at least one first duct for channeling a flow of a fluid;
 at least one second duct for channeling another flow of a fluid;
 a first needle mounted to move in translation, in a first direction, between an open position and a closed position for opening and closing the at least one first duct, the body forming a first seat for the first needle; and
 a second needle mounted to move in translation, in a second direction, between an open position and a closed position for opening and closing the at least one second duct;
 where the first direction and the second direction are parallel or coincide, the first needle defines a recess for receiving the second needle, the first needle forms a second seat for the second needle and the body defines the at least one first duct, and the second needle has an internal cavity forming a portion of the at least one second duct, the valve being characterized in that:
 the body has an opening common to the at least one first duct and to the at least one second duct and
 the first needle and the second needle come flush with said opening.

2. A valve according to claim 1, wherein the first needle and the second needle are circularly symmetrical respectively about the first direction and about the second direction, and wherein the first needle and the second needle are arranged coaxially.

3. A valve according to claim 1, wherein it further comprises at least one resilient member for urging the first needle and the second needle back into their respective closed positions in which they close the at least one first duct and the at least one second duct, and wherein the first needle and the second needle have respective thrust surfaces arranged in such a manner as to transmit thrust forces exerted by a thrust fluid, in the first direction or in the second direction in opposition to the at least one resilient member.

4. A valve according to claim 3, wherein the at least one resilient member is formed by a crest-to-crest multi-turn spring.

5. A valve according to claim 1, wherein the at least one first duct extends substantially transversely to the at least one second duct.

6. A valve according to claim 1, wherein the at least one first duct and the at least one second duct are arranged to receive a cleaning fluid, or a coating fluid.

7. A valve according to claim 1, wherein the first seat and the second seat are frustoconical in shape.

8. A valve according to claim 1, wherein the first needle and the second needle present wetted surfaces that are substantially locally tangential to lines of flow of the fluids, in such a manner as to limit fluid retention.

9. An atomizer for spraying coating material, wherein said atomizer includes a valve according to claim 1.

10. A valve according to claim 1, wherein the first direction and the second direction are co-linear and coincide.

* * * * *